United States Patent [19]

Nakamura

[11] Patent Number: 4,605,458
[45] Date of Patent: Aug. 12, 1986

[54] METHOD OF PRESSURE BONDING COMPOSITE MATERIALS

[75] Inventor: Masao Nakamura, Toyohashi, Japan

[73] Assignee: Taiho Kogyo Co., Ltd., Toyota, Japan

[21] Appl. No.: 626,835

[22] PCT Filed: Oct. 25, 1983

[86] PCT No.: PCT/JP83/00378

§ 371 Date: Jun. 25, 1984

§ 102(e) Date: Jun. 25, 1984

[87] PCT Pub. No.: WO84/01733

PCT Pub. Date: May 10, 1984

[30] Foreign Application Priority Data

Oct. 25, 1982 [JP] Japan .................. 57-187300
May 23, 1983 [JP] Japan .................. 58-90178

[51] Int. Cl.$^4$ ............................................. B32B 31/08
[52] U.S. Cl. ................................. 156/164; 156/229; 156/324; 156/555
[58] Field of Search ............. 29/469.5, 505; 156/164, 156/324, 555, 229

[56] References Cited

U.S. PATENT DOCUMENTS

| | | | |
|---|---|---|---|
| 3,081,212 | 3/1963 | Taylor et al. | 156/164 |
| 3,901,758 | 8/1975 | Humphries | 156/555 X |
| 3,951,727 | 4/1976 | Greenberg | 156/584 |
| 4,069,081 | 1/1978 | Drower et al. | 156/324 X |
| 4,470,589 | 9/1984 | Singer | 156/324 X |
| 4,517,042 | 5/1985 | Singer | 156/164 |

FOREIGN PATENT DOCUMENTS 54-39266 11/1979 Japan .
58-110186 6/1983 Japan .

*Primary Examiner*—Robert A. Dawson
*Attorney, Agent, or Firm*—Flynn, Thiel, Boutell & Tanis

[57] ABSTRACT

A method of pressure bonding composite material comprises passing a pair of strips through a nip defined between a pair of abutting rolls. At least one of a composite material which is pressure bonded as a result of passage through the nip and one of the strips which are to be introduced into the nip is wrapped around an associated roll. While the composite material or the strip is so disposed, the pair of rolls are driven at differential peripheral speeds, thereby controlling the draft of each strip.

8 Claims, 6 Drawing Figures

METHOD OF PRESSURE BONDING COMPOSITE MATERIALS

TECHNICAL FIELD

The invention relates to a method of pressure bonding composite materials, particularly applicable to the pressure bonding of a pair of strips.

BACKGROUND OF THE PRIOR ART

The conventional practice of pressure bonding includes passing a pair of strips in superimposed condition between a pair of abutting rolls which rotate in opposite directions with an equal peripheral speed, thereby integrally bonding the strips together under the influence of the pressure applied by the rolls. However, according to this procedure, the draft of each strip is uniquely determined by the resistance to deformation, the diameter of each roll or the load per unit area of each strip, and hence it is necessary to change the ratio of diameters of the abutting rolls in order to adjust the draft of each strip, which is a toublesome operation.

DISCLOSURE OF THE INVENTION

It is an object of the invention to provide a method of pressure bonding composite materials which permits the draft of each strip to be controlled without changing abutting rolls, by merely changing the peripheral speed thereof.

In accordance with the invention, there is provided a method of pressure bonding composite materials in which a pair of strips are passed through a nip between a pair of counterrotating abutting rolls. This method is characterized in that at least one of composite material which has passed through the nip and a strip which is to be introduced into the nip is wrapped around the roll, and the pair of abutting rolls are driven at different peripheral speeds while both the composite material and the strip are situated between the rolls. By adjusting the ratio of peripheral speeds of the pair of abutting rolls, the draft of each strip can be changed.

According to the method of the invention, at least one of the composite material and the strip is wrapped around one of the abutting rolls, and hence the control of the tension applied to either the composite material or the strip to maintain its neutral position at a given location and thereby to allow a stabilized bonding process is facilitated.

It is another object of the invention to facilitate the application of such method to a strip such as a thick backing steel plate which is difficult to be bent.

While one of the strips is wrapped around one of the abutting rolls, the other strip having an increased thickness as well as the composite material, formed by the both strips integrally bonded together, are passed through the nip without being substantially wrapped about the roll, whereby the strip having an increased thickness can be conveyed along a straight path.

BRIEF DESCRIPTION OF THE DRAWINGS

FIG. 4 is a schematic view of the overall arrangement according to another embodiment of the invention;

BEST MODE FOR CARRYING OUT THE INVENTION

Figure 1:
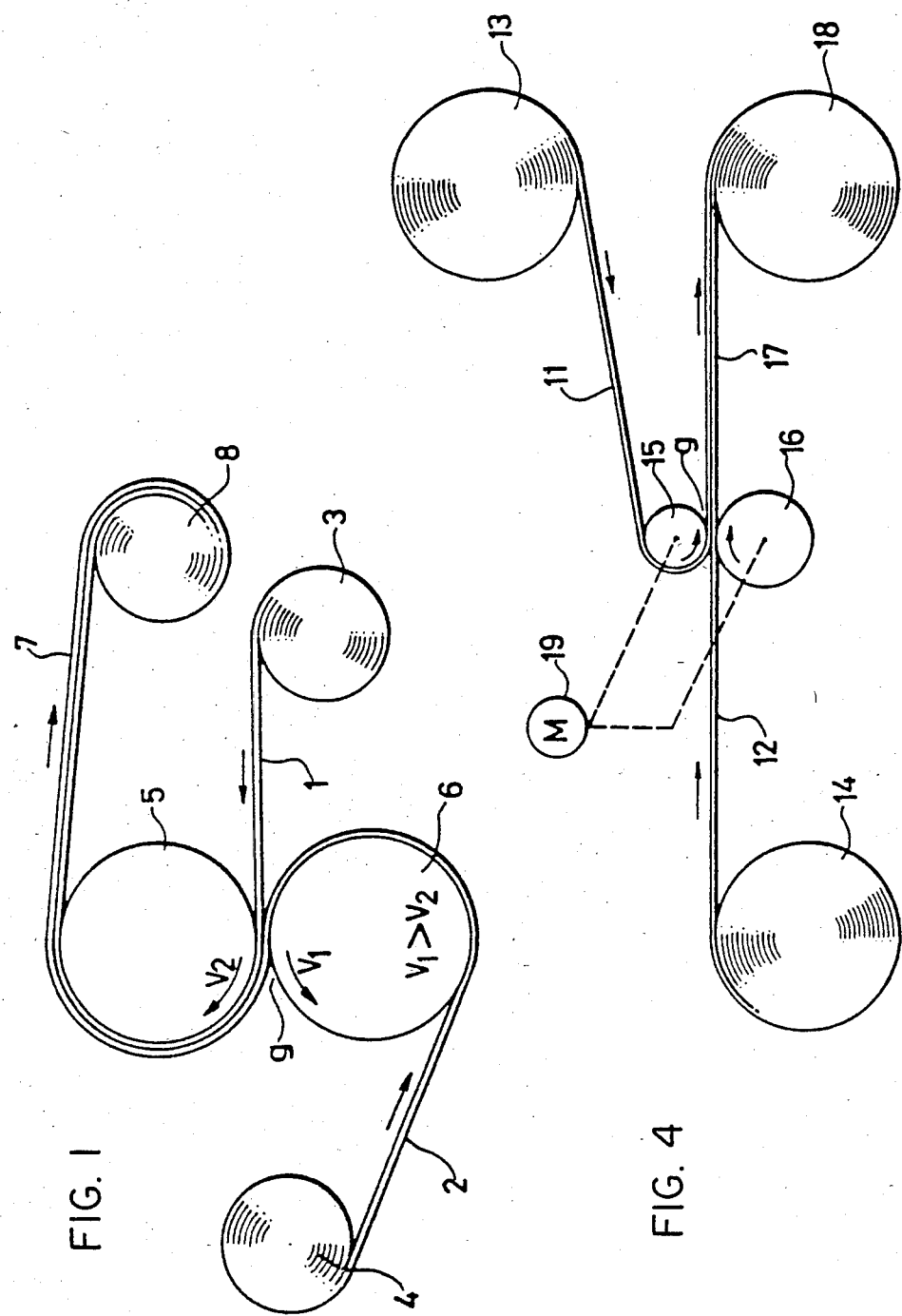
FIG. 1 is a schematic view of the overall arrangement according to one embodiment of the invention.

Referring to FIG. 1, there are shown a first and a second strip 1, 2 which are paid off a pair of supply reels 3, 4, respectively. The first strip is directly supplied from reel 3 into a nip or gap g defined between a pair of abutting rolls 5, 6 while the other or second strip 2 is wrapped around the second roll 6 before it is supplied into the nip g between the rolls 5, 6. The pair of abutting rolls 5, 6 bond the first and the second strip 1, 2 together under pressure, thereby forming a composite material 7. It will be noted that the composite material 7 is wrapped around the other or first roll 5 with the first strip 1 located inside. After leaving the roll 5, the composite material 7 is coiled by a take-up reel 8.

While the pair of abutting rolls 5, 6 are shown as having an equal diameter in the embodiment shown, it is to be noted that the first roll 5 is driven at a peripheral speed which is greater than that of the second roll 6, thus driving the both rolls 5, 6 at differential peripheral speeds. A tension is applied to the second strip 2 and the composite material 7 in any suitable known manner (not shown), thus causing a wrapping of the second strip 2 and the composite material 7 around the second roll 6 and the first roll 5, respectively with respective given forces. This avoids the occurrence of any substantial slip between the respective rolls 5, 6 and the composite material 7 and the second strip 2 if the both rolls 5, 6 rotate at differential peripheral speeds.

Figure 2:
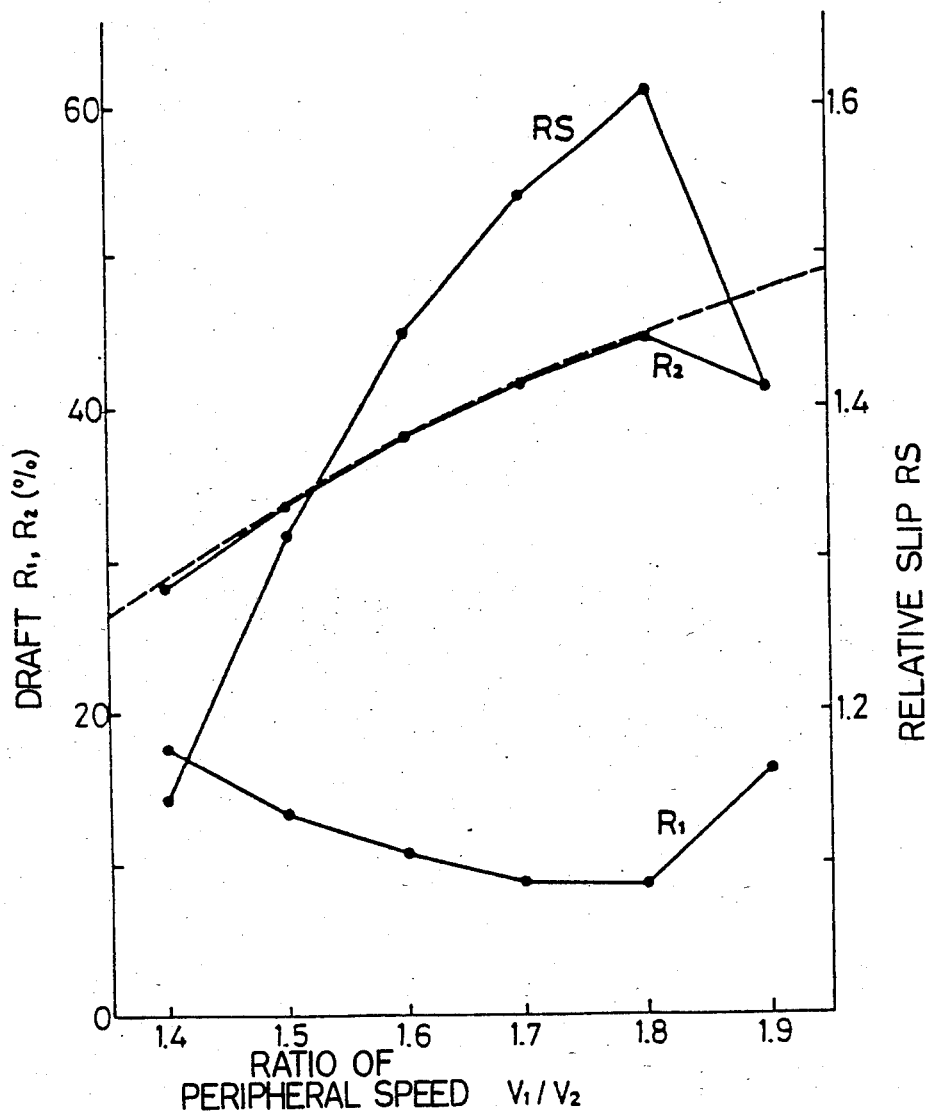
FIG. 2 graphically illustrates the relationships between the ratio of peripheral speeds on one hand and the draft of the first and the second strip (R1, R2) and the relative slip (Rs) prevailing in the embodiment of FIG. 1, on the other.

The effect achieved with the invention can best be described in terms of experimental results. FIG. 2 graphically illustrates the draft of each strip 1, 2 which is determined under the conditions indicated below. In FIG. 2, R1 and R2 represent the draft of the first and the second strip 1, 2, respectively, V1 and V2 the peripheral speed of the first and the second strip 1, 2, respectively, and RS a relative slip defined as a ratio of speeds of the first and the second strip 1, 2 at the entrance of the nip between the abutting rolls 5, 6. The broken line curve represents the draft of the second strip 2 which is determined from the ratio of the inlet and the outlet speed of the second strip 2 as it enters and leaves the nip between the abutting rolls 5, 6, assuming that the inlet and the outlet speed are equal to the lower speed of the roll 6 and the higher speed of the roll 5, respectively.

The experiments have been conducted using the parameters identified below.

Equipment: Differential speed rolling mill.

Material and size of strips 1, 2: Cold rolled steel web (SPCC equivalent to SAE1010), having a thickness of 0.5 mm and a width of 50 mm.

Tension applied to the composite material 7 (hereafter referred to as a forward tension): 600 kgf Tension applied to the second strip 2 (hereafter referred to as a rearward tension): 530 kgf Diameters of abutting rolls 5, 6: 100 mm Peripheral speed of rolls 5, 6: The peripheral speed V1 of the first roll 5 is chosen greater than the peripheral speed V2 of the second roll 6, and the ratio of such peripheral speeds (V1/V2) is varied in a range between 1.4 and 1.9.

Degreasing of the strips 1, 2 and the rolls 5, 6: Degreasing with acetone.

As will be noted in the experimental results shown in FIG. 2, the draft of the second strip 2 corresponds to the draft which is calculated from the ratio of peripheral speeds for a range of the ratio of peripheral speeds from about 1.4 to 1.8, and thus it is concluded that the draft of the respective strips 1, 2 can be adjusted in accordance with the ratio of peripheral speeds.

Figure 3:
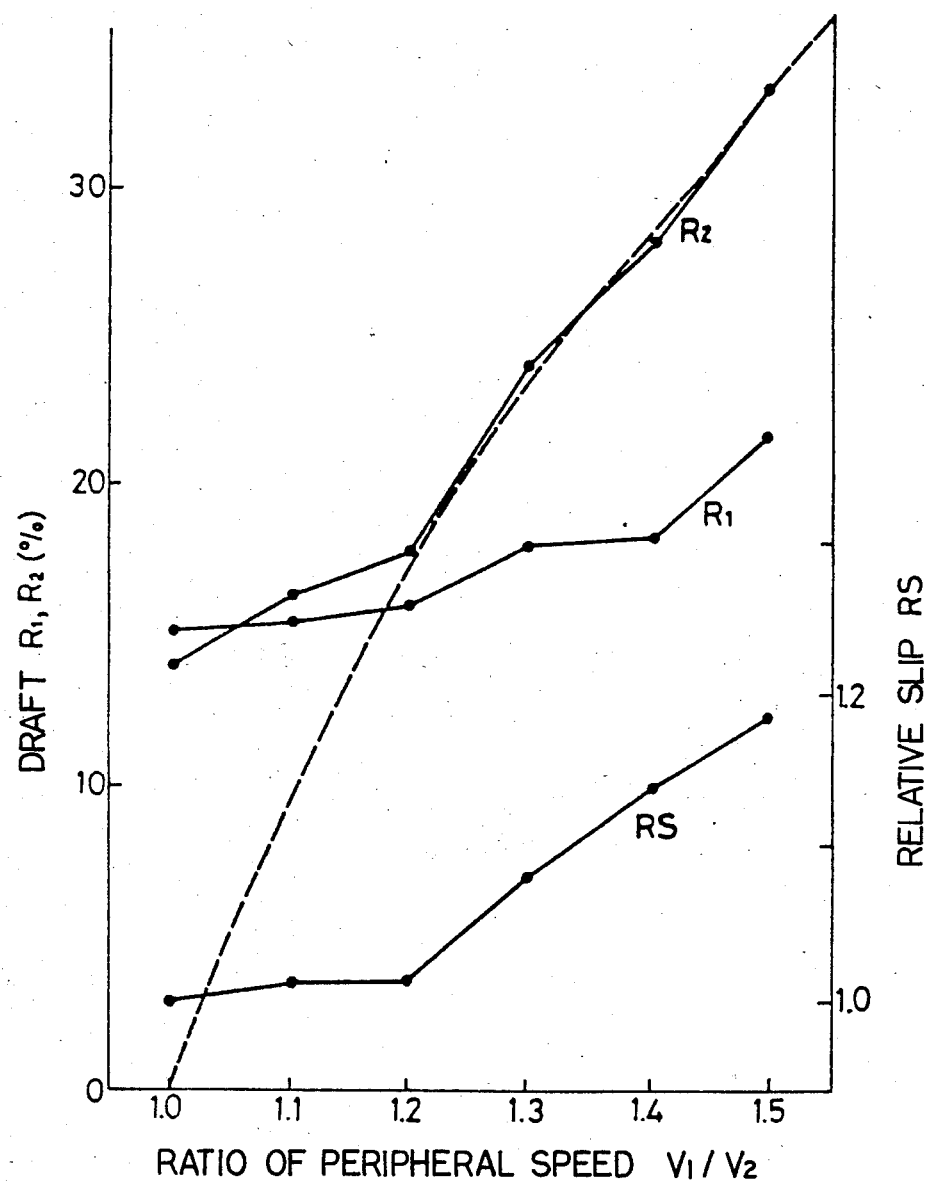
FIG. 3 is a similar graph to FIG. 2, illustrating corresponding relationships when different materials are used.

FIG. 3 graphically illustrates similar relationships as indicated in FIG. 2 using different strip materials. Specifically, each of the strips 1, 2 has a thickness of 0.4 mm and a width of 50 mm, and is formed of aluminium alloy (A 5052). A forward tension of 250 kgf and a rearward tension of 230 kgf are used, and the ratio of peripheral speeds is varied in a range from 1.0 to 1.5. It is noted from FIG. 3 that if the material of the strips 1, 2 is changed, the draft of the second strip 2 corresponds to a change in the ratio of peripheral speeds for a range of ratio of peripheral speeds from about 1.2 to 1.5.

When driving the pair of abutting rolls 5, 6 at differential peripheral speeds it is desirable that the neutral point between the first strip 1 and the first roll 5 or the composite material 7 and the first roll 5 be located at the exit of the nip g while the neutral point between the second strip 2 and the second roll 6 be located at the entrance of the nip. Under this condition, a relative slip between the first strip 1 and the second strip 2 will be at its maximum at the entrance and will be equal to zero at the exit while maintaining the direction of such relative slip constant. This allows the relative slip to be positively in the bonding process. Such result can be achieved easily and automatically, by wrapping the composite material 7 around the first roll 5 and wrapping the second strip 2 around the second roll 6 and applying the forward and the rearward tension to the composite material 7 and the second strip 2, respectively, thus attaining a slip of substantially zero with respect to the individual rolls 5, 6.

It is confirmed that the neutral point between the composite material 7 and the first roll 5 or the higher speed neutral point lies at the exit of the nip between the rolls and the neutral point between the second strip 2 and the second roll 6 or the lower speed neutral point lies at the entrance to the nip, both in a stable manner, for a range of the ratio from 1.4 to 1.8 in the first mentioned experiment and for a range of the ratio from 1.2 to 1.5 for the later described experiment, without any substantial slip between the individual strips 1, 2 and the rolls 5, 6. However, if either the forward or the rearward tension is reduced even though the ratio of peripheral speeds are maintained with in such range, there occurs a slip, shifting the neutral point out of the nip region, whereby the draft of the individual strips 1, 2 becomes no longer dependent on the ratio of peripheral speeds. Specifically, when the values described above are used for the magnitude of the forward and the rearward tension, the maximum value of the controllable ratio of peripheral speeds (V1/V2) will be about 1.8 or 1.5, and the draft of the strips 1, 2 can be controlled within the range described. However, if the magnitude of the tension is reduced, the force with which the strip or the material is wrapped around the individual rolls 5, 6 also decreases, reducing the maximum value of the controllable ratio of peripheral speeds.

Stated differently, if the ratio of peripheral speeds can be reduced, the magnitude of the forward or the rearward tension may be reduced. In particular, the application of the rearward tension can be dispensed with by reducing the ratio of peripheral speeds. This means that the second strip 2 is no longer wrapped around the second roll 6. Even under this condition, the higher speed neutral point lies stably at the exit of the nip since the composite material 7 is maintained wrapped around the first roll 5, and the lower speed neutral point may be located at the entrance to the nip by choosing a ratio of peripheral speeds which is within a reduced specific range. This signifies that the draft can be adjusted in accordance with the ratio of peripheral speeds within a specific range. It is to be noted that it is also possible to extend the specific range by applying the rearward tension without wrapping the second strip 2 around the second roll 6.

Conversely, it is also possible to wrap the second strip 2 around the second roll 6 without wrapping the composite material 7 around the first roll 5. In this instance, the neutral point on the lower speed side may be maintained at the entrance to the nip in a stable manner while the neutral point on the higher speed side may be located at the exit of the nip within a specific range of the ratio of peripheral speeds as mentioned above.

FIG. 4 shows another embodiment of the invention. In this embodiment, a first strip 11 is wrapped around one of abutting rolls 15, before it is supplied into a nip g between a pair of abutting rolls 15, 16 while a second strip 12 is directly supplied into the nip g from a supply reel 14.

It is to be noted that the arrangement is such that it is possible to deliver the second strip 12 to a take-up reel 18 without substantially wrapping it around the roll 16, or that the second strip can be conveyed along a substantially straight line from the supply reel 14 to the take-up reel 18. This allows the method of pressure bonding according to the invention to be readily applied for a strip such as the second strip 12 which cannot be easily bent as the first strip 11.

In this embodiment, the roll 15 around which the first strip 11 is wrapped has a diameter which is less than that of the roll 16 associated with the second strip 12, and the both rolls are connected to a common drive source 19 so as to be forcibly driven in opposite directions and with an equal number of revolutions. It will be seen that by utilizing different diameters for the both abutting rolls, differential peripheral speeds can be obtained if the both rolls are driven with an equal number of revolutions. In this embodiment, the second roll 16 has a greater peripheral speed than that of the first roll 15.

As before, a tension may be applied to the first strip 11, the second strip 12 and the composite material 17 in any suitable known manner (not shown). In particular, by wrapping the first strip 11 around the first roll 15 with a given force, any substantial slip between the individual rolls 15, 16 and the first and the second strip 11, 12 can be prevented if the both rolls are driven at differential peripheral speeds.

Figure 5:
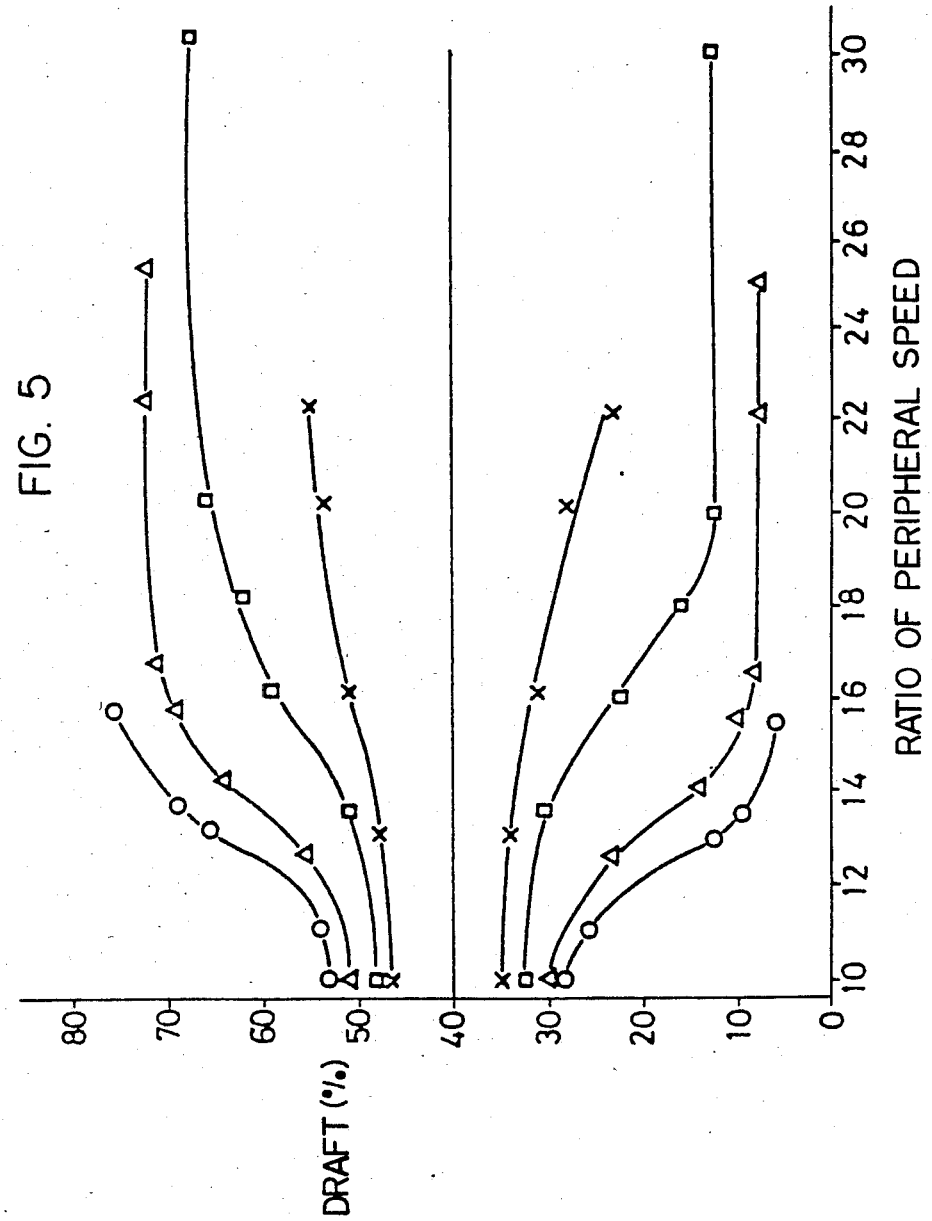
FIG. 5 graphically illustrates a series of relationships prevailing between the ratio of peripheral speeds and the draft of strips (R1, R2) which occur in the embodiment of FIG. 4.
Figure 6:
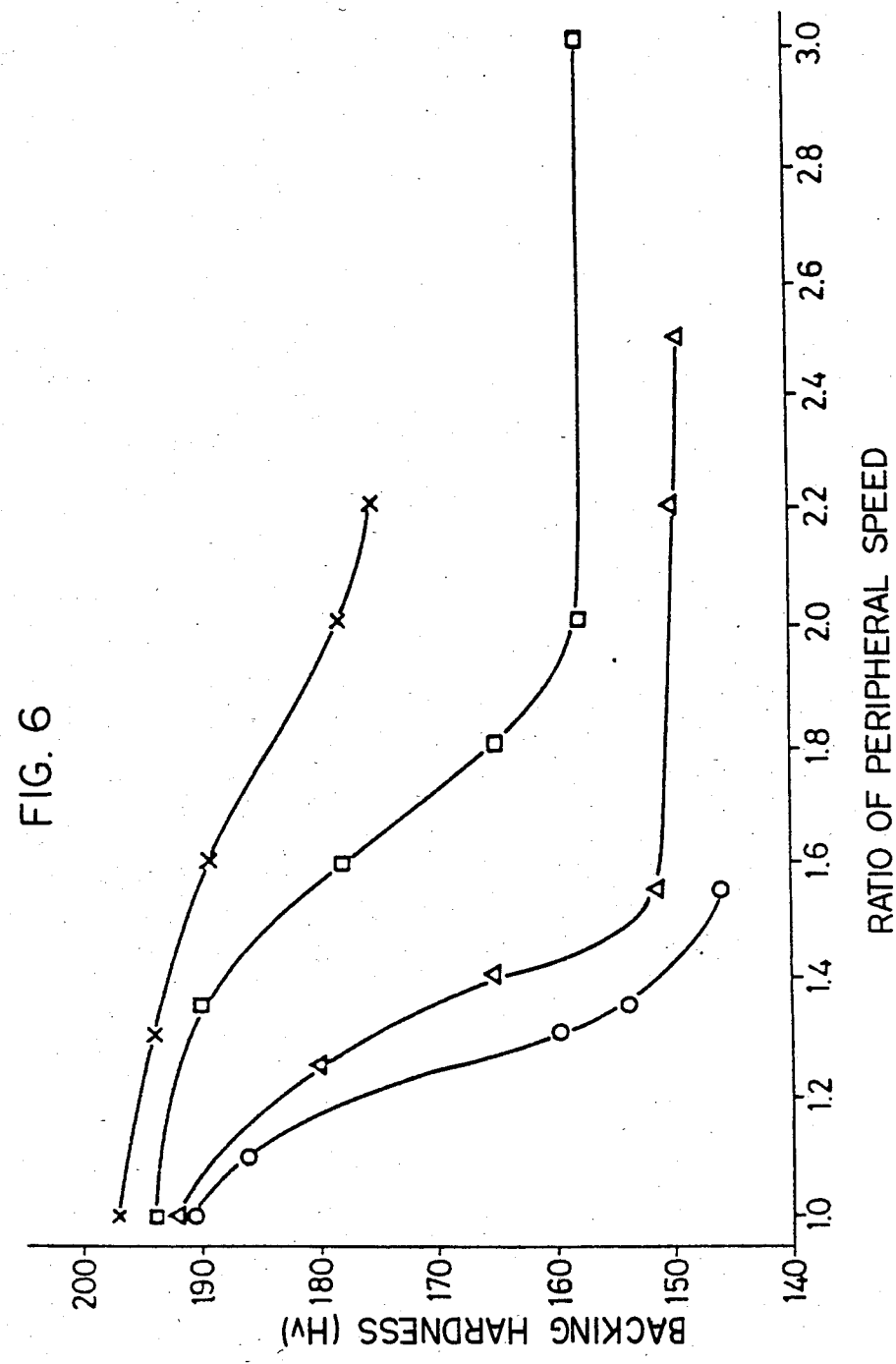
FIG. 6 graphically shows relationships between the hardness of a backing used as a second strip and the ratio of peripheral speeds which occur in the embodiment of FIG. 4.

FIG. 5 graphically illustrates the draft of the first and the second strip 11, 12 in the resulting composite material 17 as a function of a varying ratio of peripheral speeds when four values are chosen for the ratio of diameters of the pair of abutting rolls 15, 16 (hereafter referred to as "roll ratio"). FIG. 6 graphically shows the resulting hardness of the second strip 12.

In this embodiment, the first strip 11 is formed of aluminium bearing alloy having a thickness of 1.40 mm and the second strip 12 is formed by a steel web SA-E1010 having a thickness of 1.38 mm which is used as a backing of the aluminium bearing alloy. The aluminium bearing alloy has a composition comprising 20% Sn, 1% Cu (by weight) and the rest of Al.

In FIG. 5, x corresponds to a roll ratio of 1.0 or equal diameter, □ to a roll ratio of 2.0, Δ to a roll ratio of 6.0, and O to a roll ratio of 10.6, respectively. It is to be noted that the second roll 16 has a greater diameter. It is also to be noted that FIG. 5 shows the draft of the strips 11, 12 obtained when the total draft achieved by the pressure bonding is converted as being equal to 40%. Thus the draft located above 40% represents the draft of the first strip 11 or aluminium bearing alloy while the draft below 40% indicates the draft of the second strip 12 or backing.

It will be seen from experimental results shown in FIGS. 5 and 6 that by increasing the ratio of peripheral speeds, the draft of the backing can be reduced, thus reducing the degree of work hardening. If a bearing material having a backing of an increased hardness is used to form a bearing, a relatively difficult machining operation will be required. In addition, it becomes difficult to achieve a high level of trueness or straightness for the bearing. In addition, residual sources of increased magnitude which remain within the bearing after its manufacture may cause a deformation of the bearing, thus causing adverse influences upon the performance of the bearing. However, by reducing the draft of the backing, these drawbacks can be avoided improved.

It is found by experiments that the draft of the backing side can be reduced by choosing an increased roll ratio for the ratio of peripheral speeds which is equal to 1.0. In particular, when an increased ratio of peripheral speeds is used for the choice of an increased value of roll ratio, a reduction in the draft of the backing side will be remarkable, producing a synergetic effect.

I claim:

1. A method of pressure bonding composite material comprising passing a pair of strips through a nip defined between a pair of counterrotating abutting rolls and therewith bonding them together under pressure into a composite material strip, wherein the improvement comprises the steps of
wrapping at least one of the following:
   (1) the composite strip, which has passed through the nip, around one of said pair of abutting rolls, and
   (2) one of said pair of strips, which is to be introduced into said nip, around the other of said pair of abutting rolls; and
simultaneously driving said abutting pair of rolls at different peripheral speeds.

2. A method of pressure bonding according to claim 1, wherein it is only said composite material strip, which has passed the nip, which is wrapped around a said roll.

3. A method of pressure bonding according to claim 1, wherein it is at least one of the strips of said pair that is wrapped around a said roll.

4. A method of pressure bonding according to claim 1, wherein it is both said composite material strip, which has passed the nip, that is wrapped around said one roll, and one of said strips, which is to be introduced into the nip, that is wrapped around said other roll.

5. A method of pressure bonding according to claim 1, in which the other of said strips is fed directly into said nip without significant wrapping engagement with either of said pair of abutting rolls.

6. A method of pressure bonding composite material comprising passing a pair of strips through a nip defined between a pair of counterrotating abutting rolls and therewith pressure bonding them together under pressure into a composite material strip, wherein the improvement comprises wrapping one of said pair of strps, to be introduced into the nip, around one of said abutting rolls under a given pressure, causing the other of said pair of strips and said composite material strip to pass through the nip without any substantial wrapping thereof around either said roll, and driving said pair of rolls at differential peripheral speeds while said strips pass through the nip.

7. A method of pressure bonding according to claim 4, including maintaining the neutral point between the other of said pair of strips and said one roll and the neutral point between said composite material strip and said one roll at the exit of said nip, while maintaining the neutral point between said one of said pair of strips and said other roll at the entrance to said nip, such that slip between said pair of strips is maximum at said entrance of said nip and substantially zero at the exit of said nip with the direction of said slip constant, and applying tension forwardly to the composite material strip and rearwardly to said one of said pairs of strips, while maintaining the ratio of peripheral speeds of said abutting rolls in a range of values exceeding one.

8. A method of pressure bonding according to claim 6, wherein said other strip and said composite material strip are conveyed along a substantially straight path.

* * * * *